United States Patent [19]

LeBoeuf

[11] 3,971,872

[45] July 27, 1976

[54] PROCESS FOR THE PRODUCTION OF AN ABRASION RESISTANT OPTICAL ELEMENT

[75] Inventor: Albert R. LeBoeuf, Sturbridge, Mass.

[73] Assignee: American Optical Corporation, Southbridge, Mass.

[22] Filed: Sept. 30, 1974

[21] Appl. No.: 510,348

[52] U.S. Cl. .............................. 428/412; 427/164; 427/240; 427/322; 427/387; 427/399; 427/430
[51] Int. Cl.² .......................................... B05D 5/06
[58] Field of Search ............ 117/138.8 R, 101, 113; 427/387, 385, 322, 164, 169, 240, 399, 430; 428/412

[56] References Cited
UNITED STATES PATENTS

| | | | |
|---|---|---|---|
| 2,923,640 | 2/1960 | Buckingham | 117/101 |
| 3,429,845 | 2/1969 | Bechtold et al. | 427/385 |
| 3,429,846 | 2/1969 | Bechtold et al. | 427/385 |
| 3,652,379 | 3/1972 | White et al. | 117/138.8 R |
| 3,713,869 | 1/1973 | Geffcken et al. | 117/138.8 R |

*Primary Examiner*—Cameron K. Weiffenbach
*Attorney, Agent, or Firm*—H. R. Berkenstock, Jr.; William C. Nealon

[57] ABSTRACT

A process for preparing an abrasion resistant allyl diglycol carbonate lens is provided. The allyl diglycol carbonate lens prepared by the process of the invention has an abrasion resistant coating thereon comprised of a transparent base of a hydrolyzed polysilicic acid ester and polyvinyl alcohol comprising 90 to 100% hydrolyzed polyvinyl acetate.

10 Claims, No Drawings

PROCESS FOR THE PRODUCTION OF AN ABRASION RESISTANT OPTICAL ELEMENT

BACKGROUND OF THE INVENTION

The allyl diglycol carbonate synthetic polymers are used extensively for eyeglass lenses and other lenses in the optical industry. Such polymeric lenses are advantageous since they can be manufactured inexpensively by casting making it possible to obtain thereby complicated surface configurations directly without expensive grinding. While the allyl diglycol carbonate polymers are substantially resistant to scratching as compared to lenses made of methylmethacrylate polymers, it is desirable to further increase the abrasion resistance of the allyl diglycol carbonate lenses by applying thereto a hard transparent protective layer.

FIELD OF THE INVENTION

The invention relates to optical components such as ophthalmic lenses of an allyl diglycol carbonate protected by an abrasion resistant coating.

DESCRIPTION OF THE PRIOR ART

U.S. Pat. No. 2,404,426 relates to the preparation of coated organic polymer substrate having a surface film thereon obtained by coating the surface of the polymer with a coating solution comprising a polysilicic acid ester of an alcohol containing from 1 to 12 carbon atoms inclusive and having from 0.01 to 2.0 silicic acid ester groups per silicon atom together with an organic polymeric material compatible with said ester in the solvent free film and an organic solvent for the polymer the surface of which is being coated. The patent discloses that condensation polyester resins are among those polymer substrates which are adapted to be coated by the process of the invention. The compatible organic polymer which is used in combination with the polysilicic acid ester can be, for instance, a ureaformaldehyde or phenol-aldehyde type polymer or can be a partially hydrolyzed polymer which contains free alcohol or hydroxyl groups such as polyvinyl alcohol.

The allyl diglycol carbonate polymer composition chosen as a polymer substrate in the process of the invention is generally described as an addition type and not a condensation type polymer. Fully hydrolyzed polyvinyl alcohol (about 90% to 100% hydrolyzed) is utilized in the coating process of the invention to provide increased abrasion resistance over polysilicic acid ester coatings containing partially hydrolyzed polyvinyl alcohol (about 60 to about 85% hydrolyzed). The allyl diglycol carbonate of the invention has generally good resistance to abrasion such as by rubbing with emery paper but by the method of the invention the surface can be upgraded further with respect to resistance to such abrasion.

U.S. Pat. No. 3,484,157 relates to an abrasion resistant transparent plastic optical element prepared by the application of a transparent base of organic material having a directly adhering coating comprised of a vinyl polymer cross-linked with a dialdehyde cross linking agent. There is disclosed that the process of the patent can be used to upgrade a lens formed of allyl diglycol carbonate.

U.S. Pat. No. 2,404,357 relates to a coated methylmethacrylate polymer prepared by the application of a coating solution comprising ethyl silicate hydrolyzed with at least 15% by weight of water together with a partially hydrolyzed vinyl acetate polymer, said coating subsequent to application to the methylmethacrylate polymer surface is pressed against a rigid surface at elevated temperature to cure the coating and properly bond the coating to the surface of the methylmethacrylate polymer.

U.S. Pat. No. 3,700,487 discloses an anti-fog abrasion resistant coating of lightly cross-linked polyvinyl alcohol on a diallyl glycol carbonate lens in which adequate bonding of the anti-fog coating is obtained by first hydrolytically treating the polymer surface by dipping in an aqueous or alcoholic solutions of caustic such as sodium or potassium hydroxide.

SUMMARY OF THE INVENTION

A process for preparing an allyl diglycol carbonate coated lens is disclosed comprising applying to said lens a coating solution of an hydrolyzed polysilicic acid ester in combination with about 90% to 100% hydrolyzed polyvinyl alcohol. In the process of the invention the coating is applied to at least one surface of said lens, volatiles are allowed to escape from the coating solution and the coating is then cured at elevated temperature. Coated allyl diglycol carbonate lenses are obtained by the process of the invention having improved abrasion resistance over the uncoated lens. Adhesion of the coating can be promoted by hydrolytically treating the surface of the polymer lens by alkali treatment prior to coating.

DESCRIPTION OF THE PREFERRED EMBODIMENTS

The abrasion resistant allyl diglycol carbonate lens of this invention includes a transparent base element formed in a conventional manner by thermoforming, casting or the like.

In accordance with this invention the lens is provided with a directly adhering, transparent, abrasion resistant surface coating of polyvinyl alcohol comprising about 90% to 99% hydrolyzed polyvinyl acetate in combination with an hydrolyzed polysilicic acid ester of an alcohol containing from 1 to 12 carbon atoms inclusive, said ester having up to four silicic ester groups per silicon atom. The polyvinyl alcohol is conventionally obtained by the hydrolysis of polyvinyl acetate.

The coating solution is prepared in the form of an aqueous solution having a solids concentration of about 22% to about 26% weight percent. The proportion of said polyvinyl alcohol to the polysilicic acid ester is about 1 to about 7.

Silicic acid from which the polysilicic acid ester is prepared contains hydroxyl groups attached to silicon. The esters are hydrolyzed prior to application. Polysilicic acid esters are characterised by the following structure:

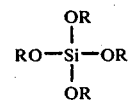

where R is a $-(CH_2)_n-CH_3$ radical and $n$ is 0 to 11.

The polyvinyl alcohol solution utilized to coat the lens is prepared as an aqueous solution by addition of the polyvinyl alcohol to the desired amount of boiling demineralized water which is under strong agitation at the time of the addition of the polyvinyl alcohol. Strong agitation is maintained until complete solution is obtained. After complete solution of the polyvinyl alcohol, the desired amount of an alcohol having a carbon chain length of C1 to C4 is added as rapidly as possible short of causing precipitation of the polyvinyl alcohol and a small amount of a wetting agent such as an alkyl phenoxy polyethoxy ethanol sold under the trademark "Triton X100" is added to increase the wetting ability of the coating solution for the allyl diglycol carbonate lens.

The surface treatment of the diallyl glycol carbonate lens has been found to be an important step in improving the moisture resistance of the coated assembly. Hydroxylation of the surface of the diallyl glycol carbonate is preferably effected by the use at 10°C to 40°C, preferably room temperature, of an aqueous solution of an alkali such as sodium hydroxide or potassium hydroxide. The concentration of alkali is from about 2% by weight to about 20% by weight. The treatment time is about 2 minutes to about 1 hour. It is theorized that the alkali treatment of diallyl glycol carbonate polymer splits ester groups on the polymer chain and introduces one OH groups onto the chain.

The polysilicic acid ester can be hydrolyzed with an amount of water equal to at least 15% by weight of the ester, i.e. ethyl silicate, which is commercially available as chiefly tetraethyl orthosilicate. Hydrolysis of the tetraethyl orthosilicate is usually accomplished by adding this material to a solution of freshly prepared polyvinyl alcohol at elevated temperature.

At least one side of the allyl diglycol carbonate base lens element is coated with the coating solution in any conventional manner, for instance the lens element can be dipped in the combined solution to form a uniform coating following which the coated lens can be heated at elevated temperature to dry the coating and remove volatiles. During this heating process, the polysilicic acid ester and polyvinyl alcohol combine in a condensation process to form a directly adhering, transparent, cross-linked, abrasion resistant coating on the lens element. The coating is heated to a temperature of between about 90°C to about 125°C for a period of from 1 to 2 hours in order to dry and cure the abrasion resistant coating. While a range of temperatures has been provided for drying and curing the coated lens, it will be recognized by persons skilled in the art that other temperatures higher and lower than disclosed above can be used.

As an alternate coating method the lens can be spun and the coating solution applied to at least one side of the spinning lens. The coated lens is then air dried at elevated temperature as before preferably between about 90°C and about 125°C. A durable, abrasion resistant coating is obtained.

The following example illustrates specific embodiments of the invention but is to be considered in no way as limiting the scope of the invention since it will be apparent to one skilled in the art that many variations are possible and are encompassed within the scope of the subject disclosure. In the specification all solutions are described as being applied at room temperature and in the specification and claims all proportions are by weight and all temperatures are in degrees centigrade unless otherwise indicated.

EXAMPLE 1

A coating solution was prepared by hydrolyzing tetraethylorthosilicate and incorporating a polyvinyl alcohol as internal plasticizer and cross-linking agent together therewith in combination with water and ethanol as a solvents and alkyl phenoxy polyethyoxy ethanol as a wetting agent.

A coating was prepared using the following amounts of materials in grams:

| | |
|---|---|
| demineralized water | 182 grams |
| polyvinyl alcohol (sold under the trademark "Elvanol 71-30") | 8 grams |
| ethanol | 112 grams |
| alkyl phenoxy polyethoxy ethanol | 1 drop |
| 0.5 normal hydrochloric acid | 18 grams |
| tetraethyl orthosilicate | 80 grams |

The polyvinyl alcohol which was 99% to 100% hydrolyzed was dissolved in the demineralized water by heating the water to boiling prior to adding the polyvinyl alcohol with rapid agitation. When the polyvinyl alcohol has completely dissolved the ethanol is added rapidly but not so as to cause precipitation in the polyvinyl alcohol. Next the alkyl phenoxy polyethoxy ethanol is added in the amount of 1 drop followed by addition of the 0.5 normal hydrochloric acid and finally tetraethyl orthosilicate is added.

The surface of the allyl diglycol carbonate lens is treated to promote adhesion by hydrolyzing the lens in a 15 percent by weight solution of sodium hydroxide for 15 minutes at 20°C. The lens is thereafter washed thoroughly and then immersed in demineralized water prior to coating.

The surface treated lens of allyl diglycol carbonate is placed in a chuck and spin coated with the above solution diluted on an equal weight basis with a mixture of equal parts of isopropanol and demineralized water. In the process of applying the solution to a spinning lens of allyl diglycol carbonate, the rate of spin is set at 2200 to 2800 revolutions per minute. The application of the coating is conducted in an enclosure in which the temperature is maintained at about 20° to 25°C. Subsequent to the application of the coating, the coated lenses are cured for 2 hours at 95°C.

It has been found that the rate at which the lens is spinning determines the coating thickness applied. For instance at a spinning rate of about 2500 revolutions per minute, a final coating thickness of 0.54 microns is applied to the lens. As the rate of spin increases ordinarily a reduced amount of coating will be applied.

Samples of allyl diglycol carbonate lenses coated using the above procedure were evaluated for abrasion resistance by an abrasion testing device which provides 72 strokes per minute, at a stroke speed of 3.3 inches per second, a stroke distance of 1 ⅜ inches and a load of 200 grams per square inch. Using an abrasion surface of No. 600 Crystolin, a coated lens of 0.5 microns thickness was evaluated together with a double coated lens and crown glass. Results are as follows:

| Coating | % Haze |
|---|---|
| Example 1 - 1 coat (0.5 microns) | 3 – 3.5 |
| Example 1 - 2 coats (1.0 micron) | 2.5 – 3 |
| crown glass - none | 1.1 |

The coated lenses prepared in Example 1 were placed in a humidity test chamber maintained at 160°F and 95% relative humidity. Prior to testing in the humidity chamber, the samples were conditioned at ambient temperature for 24 hours following cure. The test conditions are as follows: Eight hours exposure in the humidity chamber followed by 16 hours at ambient temperature is equal to one cycle. Samples were exposed to a total of three cycles. Results indicate no crazing of the coated lenses occurs.

EXAMPLE 2

(comparative example)

(forming no part of this invention)

The process of Example 1 is repeated except that a partially hydrolyzed grade of polyvinyl alcohol sold under the trademark "Gelvatol 20–60" is used as a substitute for the so-called fully hydrolyzed grade of polyvinyl alcohol used in Example 1. Gelvatol 20–60 is 87–89% hydrolyzed.

Abrasion test results are performed as described in Example 1. It is found that abrasion is poor as compared with results obtained in Example 1.

What is claimed is:

1. An allyl diglycol carbonate lens having a transparent abrasion resistant coating upon at least one surface obtained by (1) hydrolyzing said surface of said lens in an aqueous alkaline solution; (2) coating said lens with an aqueous coating composition comprising a mixture of an acid polysilicic ester of an alcohol containing from 1 to 12 carbon atoms and having up to four silicic acid ester groups per silicon atom, and a polyvinyl alcohol comprising 90% to 100% hydrolyzed polyvinyl acetate; and (3) drying and curing said coating at an elevated temperature.

2. An allyl diglycol carbonate lens according to claim 1 wherein said coating composition further contains a C1 to C4 carbon chain alcohol and wherein said elevated temperature is of about 90°C to about 125°C.

3. An allyl diglycol carbonate lens according to claim 2 wherein said acid polysilicic ester is tetraethylorthosilicate.

4. A process for coating an allyl diglycol carbonate lens comprising steps of (1) treating at least one surface of said lens with an aqueous alkaline solution to hydrolyze said surface; (2) applying on said treated surface an aqueous coating composition comprising a mixture of an acid polysilicic ester of an alcohol containing from 1 to 12 carbon atoms and having up to four silicic acid ester groups per silicon atom, and a polyvinyl alcohol comprising 90% to 100% hydrolyzed polyvinyl acetate; and (3) drying and curing said coating composition at an elevated temperature.

5. The process of claim 4 wherein (a) all surfaces of said lens are coated with said coating composition, (b) said composition further contains a C1 to C4 carbon chain alcohol, (c) said drying step includes drying a proportion of the volatiles from said coating composition at approximately room temperature, and (4) said curing step includes baking said coating composition on said lens at an elevated temperature of about 90°C to about 125°C.

6. The process of claim 5 wherein said alcohol is methyl alcohol.

7. The process of claim 6 wherein said coating is applied by spin coating said lens.

8. The process of claim 6 wherein said coating is applied by dipping said lens into said coating composition.

9. The process of claim 8 wherein said hydrolyzed surface of said lens is effected by treating said lens with an aqueous solution of caustic.

10. The process of claim 9 wherein said caustic is selected from the group consisting of sodium or potassium hydroxide.

* * * * *